United States Patent
Sagawa

(10) Patent No.: US 11,810,438 B2
(45) Date of Patent: Nov. 7, 2023

(54) ANALYSIS PROCESSING DEVICE AND ANALYSIS PROCESSING METHOD

(71) Applicant: DENSO CORPORATION, Kariya (JP)

(72) Inventor: Miyako Sagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/808,272

(22) Filed: Jun. 22, 2022

(65) Prior Publication Data

US 2022/0319292 A1 Oct. 6, 2022

Related U.S. Application Data

(63) Continuation of application No. PCT/JP2020/040316, filed on Oct. 27, 2020.

(30) Foreign Application Priority Data

Dec. 25, 2019 (JP) ................................. 2019-234963

(51) Int. Cl.
*G08B 21/02* (2006.01)
*G06V 40/10* (2022.01)
*G06V 20/59* (2022.01)

(52) U.S. Cl.
CPC ............ *G08B 21/02* (2013.01); *G06V 20/593* (2022.01); *G06V 40/103* (2022.01)

(58) Field of Classification Search
CPC ................ G08B 21/02; G08B 21/0492; G08B 21/0469; G08B 21/06; G06V 20/593; G06V 40/103; B60R 16/0236; F16H 63/42; B60K 28/066; B60Q 9/00
See application file for complete search history.

(56) References Cited

U.S. PATENT DOCUMENTS

| | | | |
|---|---|---|---|
| 11,256,936 B2 * | 2/2022 | Katsumata | G06V 40/103 |
| 2010/0299177 A1 * | 11/2010 | Buczkowski | G06Q 10/06311 |
| | | | 705/7.13 |
| 2014/0293129 A1 | 10/2014 | Yabu | |
| 2017/0068863 A1 * | 3/2017 | Rattner | G06V 40/10 |
| 2019/0119970 A1 * | 4/2019 | Erlacher | G06V 40/103 |
| 2019/0258879 A1 * | 8/2019 | Vachhani | G06V 40/10 |
| 2020/0081127 A1 * | 3/2020 | Angermayer | G01S 17/87 |
| 2020/0103354 A1 * | 4/2020 | Angermayer | G07C 5/006 |

(Continued)

FOREIGN PATENT DOCUMENTS

| | | |
|---|---|---|
| JP | 2010-113494 A | 5/2010 |
| JP | 2012-226635 A | 11/2012 |
| JP | 2016-62414 A | 4/2016 |

OTHER PUBLICATIONS

Lie et al., Human Fall-down Event Detection Based on 2D Skeletons and Deep Learning Approach, IEEE, 2018, 4 pgs.

(Continued)

*Primary Examiner* — Curtis J King
(74) *Attorney, Agent, or Firm* — MASCHOFF BRENNAN

(57) ABSTRACT

In an analysis processing device for performing analysis on body displacements of passengers in a vehicle, a calculation unit is configured to calculate seated and standing positions of the passengers based on recognition data. A period determination unit is configured to determine an analysis period of the vehicle according to a function that changes the analysis period depending on the seated and standing positions of the passengers.

16 Claims, 2 Drawing Sheets

(56) References Cited

U.S. PATENT DOCUMENTS

2020/0380278 A1\* 12/2020 Kim .......................... G06T 7/70
2022/0055620 A1\* 2/2022 Gassmann ............ B60W 40/09

OTHER PUBLICATIONS

Cao et al., OpenPose: Realtime Multi-Person 2D Pose Estimation using Part Affinity Fields, IEEE Transactions on Pattern Analysis and Machine Intelligence, May 30, 2019, 14 pgs.
Papandreou, et al., PersonLab: Person Pose Estimation and Instance Segmentation with a Bottom-Up, Part-Based, Geometric Embedding Model, Mar. 22, 2018, 21 pgs.

\* cited by examiner

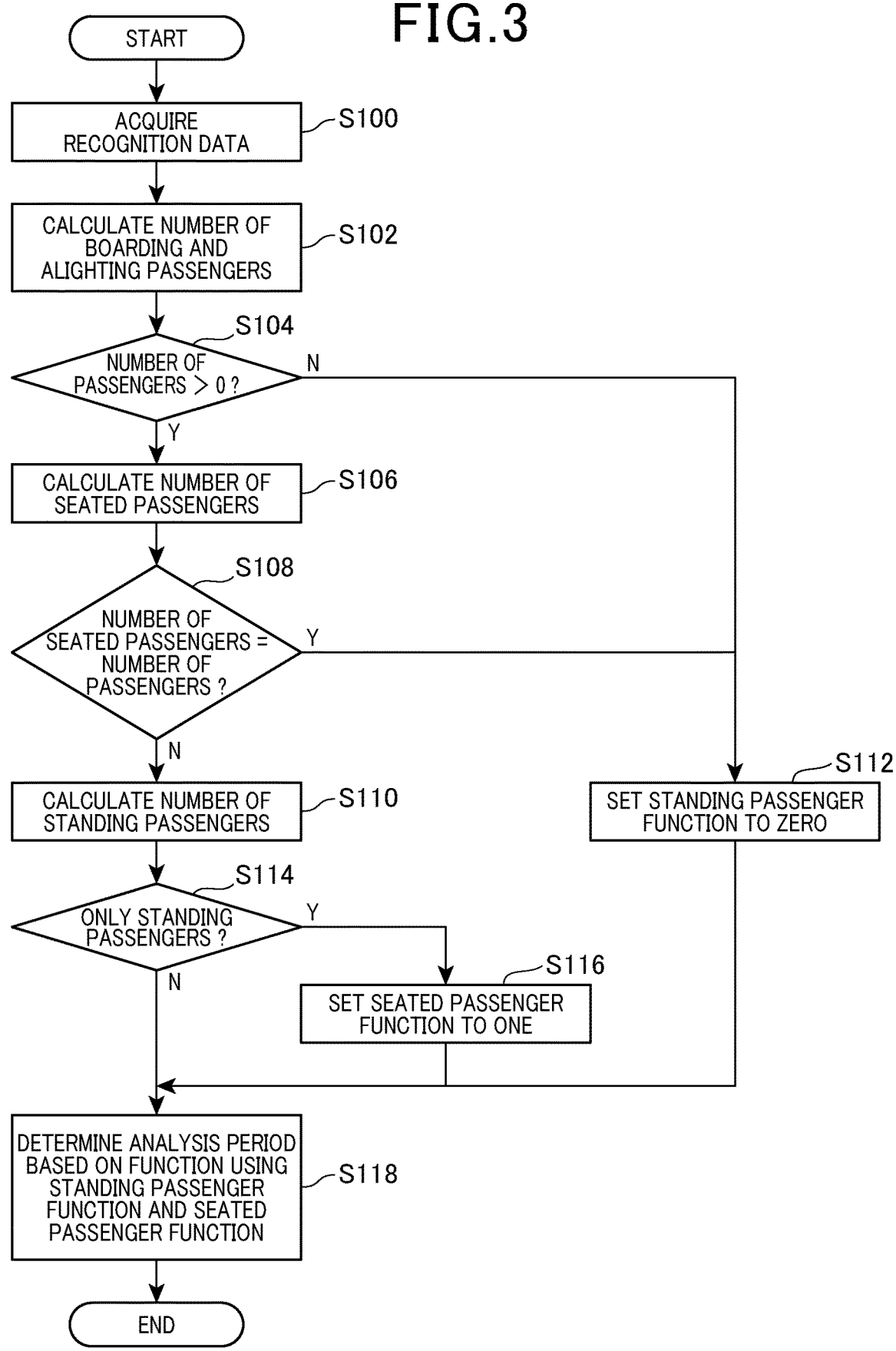

ANALYSIS PROCESSING DEVICE AND ANALYSIS PROCESSING METHOD

CROSS-REFERENCE TO RELATED APPLICATION

This application is a continuation application of International Application No. PCT/JP2020/040316 filed Oct. 27, 2020 which designated the U.S. and claims priority to Japanese Patent Application No. 2019-234963 filed with the Japan Patent Office on Dec. 25, 2019, the contents of each of which are incorporated herein by reference.

BACKGROUND

Technical Field

This disclosure relates to an analysis processing device and an analysis processing method.

Related Art

Conventionally, techniques for analyzing information inside a vehicle are known.

For example, there is a known technique that calculates a risk of a crime occurring in a vehicle based on collected factors, and collects vehicle inside information that indicates changes over time inside the vehicle at a density of information depending on the calculated risk.

BRIEF DESCRIPTION OF THE DRAWINGS

In the accompanying drawings:

FIG. 3 is a flowchart of an analysis period determination process among analysis processes to be performed by the analysis processing device.

DESCRIPTION OF SPECIFIC EMBODIMENTS

Figure 1:
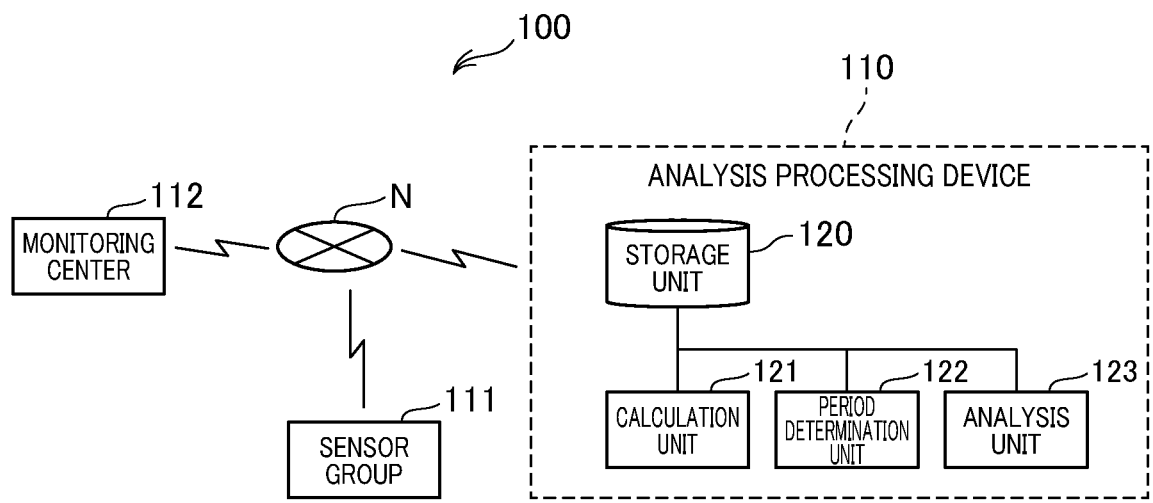
FIG. 1 is a block diagram illustrating a configuration of an analysis processing system according to one embodiment of the present disclosure.

As a result of detailed research performed by the present inventors regarding the above known technique as disclosed in JP 2010-113494 A, an issue was found that cost of calculations including image recognition and the like are high and it is therefore desirable to avoid unnecessary analysis. Another issue was found that setting a uniform analysis period may, in some situation inside the vehicle, cause analysis to be performed even when there is no need for such analysis, resulting in unnecessary cost. To reduce such unnecessary cost, it is necessary to adjust the analysis period according to the need for analysis.

In view of the foregoing, it is desired to have a technique for adjusting the analysis period from external factors and thereby suppressing cost of analysis.

One aspect of the present disclosure provides an analysis processing device for performing analysis on body displacements of passengers in a vehicle. The analysis processing device includes a calculation unit configured to calculate seated and standing positions of the passengers based on recognition data, and a period determination unit configured to determine an analysis period of the vehicle according to a function that changes the analysis period depending on the seated and standing positions of the passengers.

The analysis processing device of the present disclosure allow the analysis period to be adjusted from external factors and can suppress cost of analysis.

Hereinafter, exemplary embodiments of the present disclosure will be described in detail with reference to the accompanying drawings, in which like reference numerals refer to like or similar elements and duplicated description thereof will be omitted.

An assumption in the present embodiment of the present disclosure will now be described. The technique of the present embodiment relates to a method for adjusting the analysis period for performing analysis on body displacements of passengers in a vehicle. The vehicle is assumed to be a train, a bus or the like that carries a large number of passengers. The body displacements of passengers are not limited to falls, but also include body displacements in the direction of gravity caused by external factors. The external factors include, for example, external forces, changes due to interaction with others, and changes in the external environment. Due to such external factors, the passengers may fail to balance their joint moments and their bodies may unintentionally move in the direction of gravity, resulting in unintended changes in joint moment of the passengers. In the present embodiment, such body displacements are subjected to analysis.

As pointed out regarding the above issues, image recognition and the like associated with analysis incur significant cost. Therefore, when the need for analysis of body displacement is high, the analysis period should be decreased to increase the frequency of analysis. Conversely, when the need for analysis of body displacement is low, the analysis period should be increased to reduce the frequency of analysis.

In view of the above circumstances, in the present embodiment, the analysis period is changed adaptively to reduce calculation resources and the like required for fall detection in the vehicle. The analysis period is changed taking into account effects of external changes, that is, effects of passengers other than the subject passenger, based on the situations in the vehicle. In situations inside the vehicle where passengers are prone to fall over due to external changes, the analysis period is reduced, that is, the analysis frequency is increased. In situations inside the vehicle where passengers are less prone to fall over due to external changes, the analysis period is increased, that is, the analysis frequency is decreased. As for the effects of external changes, attention was focused on a standing position in which a passenger is standing and a seated position in which a passenger is seated. In the standing position, a passenger is considered to be more susceptible to the effects of external changes, while in the seated position, a passenger is considered to be less susceptible to the effects of external changes. In view of the foregoing, in the present embodiment, a function is introduced for changing the analysis period depending on the standing and seated positions. In the present embodiment, calculation resources and power consumption are reduced by changing the analysis period in this manner.

Referring to FIG. 1, the configuration of the analysis processing system 100 according to one embodiment of the present disclosure will now be described. FIG. 1 is a block diagram illustrating the configuration of the analysis processing system 100 of the embodiment of the present disclosure. As illustrated in FIG. 1, the analysis processing system 100 includes an analysis processing device 110, a sensor group 111, and a monitoring center 112 connected via a network N.

Figure 2:
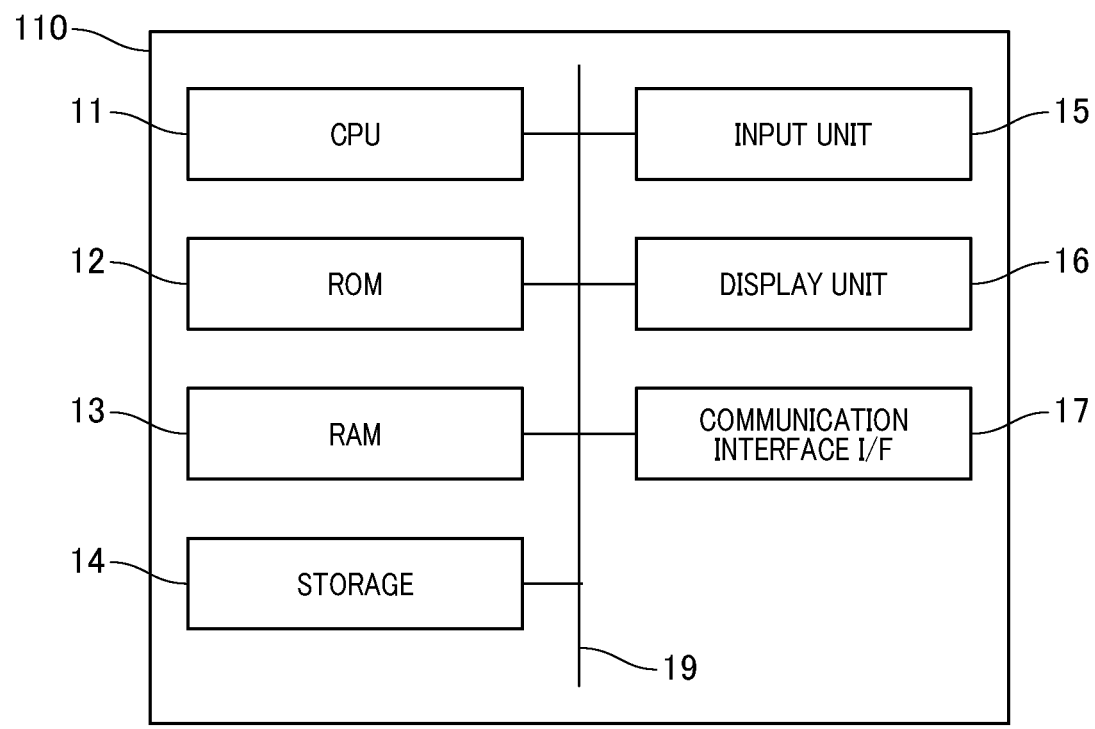
FIG. 2 is a block diagram illustrating a hardware configuration of an analysis processing device.

FIG. 2 is a block diagram illustrating the hardware configuration of the analysis processing device 110. As illustrated in FIG. 2, the analysis processing device 110 includes a central processing unit (CPU) 11, a read only memory (ROM) 12, a random access memory (RAM) 13, a storage 14, an input unit 15, a display unit 16, and a communication interface (I/F) 117. These components are communicably connected to each other via a bus 19.

The CPU 11 executes various programs and controls various components. That is, the CPU 11 reads programs from the ROM 12 or the storage 14 and executes the programs using the RAM 13 as a workspace. The CPU 11 controls each of the above components and performs various arithmetic operations according to the programs stored in the ROM 12 or the storage 14.

In the present embodiment, an analysis processing program is stored in the ROM 12 or the storage 14.

The ROM 12 stores various programs and various items of data. The RAM 13, as a workspace, temporarily stores programs or data. The storage 14 is configured as a storage device, such as a hard disk drive (HDD) or a solid state drive (SSD), and stores various programs including an operating system and various items of data.

The input unit 15 includes a pointing device, such as a mouse, and a keyboard, and is used for various types of input.

The display unit 16 is, for example, a liquid crystal display, and displays various items of information. The display unit 16 may also function as the input unit 15 employing a touch panel system.

The communication interface 17 is an interface for communicating with other devices, such as terminals. Standards, such as Ethernet™, FDDI and Wi-Fi™ are used.

The above is a description of an example hardware configuration of the analysis processing device 110.

The analysis processing device 110 is installed in the vehicle and receives recognition data from sensors 111 to analyze body displacements of passengers in the vehicle. The analysis processing device 110 transmits the analysis period and an analysis result to the monitoring center 112 as appropriate. The monitoring center 112 receives the analysis period and the analysis result from the analysis processing device 110 and performs necessary operations or the like.

The sensor group 111 is a group of various sensors installed in the vehicle that transmit recognition data to the analysis processing device 110. The sensor group 111 includes an infrared sensor that detects the number of passengers as they board and alight, an image sensor that captures images of passengers in the vehicle, a pressure-sensitive sensor that detects an occupancy of a seat, a capacitance sensor, and other types of sensors. A camera that captures images of a boarding/alighting door is also included in the sensor group 111. The recognition data is detection results of these sensors.

Each processing unit of the analysis processing device 110 will now be described. The analysis processing device 110 includes a storage unit 120, a calculation unit 121, a period determination unit 122, and an analysis unit 123.

The analysis processing device 110 receives recognition data from the sensor group 111 and stores the recognition data in the storage unit 120. The recognition data is sequentially received from the sensor group 111 and updated.

The calculation unit 121 calculates the number of passengers from a detection result of the infrared sensor or the like among the recognition data, or from a result of counting the number of boarding and alighting passengers at a boarding/alighting door using camera images. The calculation unit 121 calculates the number of seated passengers using a detection result of the pressure-sensitive sensor or the like among the recognition data. The calculation unit 121 also calculates the number of standing passengers from the number of passengers and the number of seated passengers.

The period determination unit 122 determines the analysis period of the vehicle according to a function that changes the analysis period according to a status of the seated and standing passengers in the vehicle. The function includes a standing passenger function and a seated passenger function, as defined in the following formula (1).

$$F=f_A(\alpha_A,\beta_A) \times f_B(\alpha_B,\beta_B) \quad (1)$$

In the function F, $f_A(\alpha_A, \beta_A)$ is the standing passenger function and $f_B(\alpha_B, \beta_B)$ is the seated passenger function. $\alpha_A$ is the number of standing passengers, and $\beta_A$ is a standing passenger risk. $\alpha_B$ is the number of seated passengers, and $\beta_B$ is a seated passenger risk. Hereafter, when abbreviated, the standing passenger function is denoted as $f_A$, and the seated passenger function is denoted as $f_B$. The standing passenger function $f_A$ decreases the analysis period as the number of standing passengers $\alpha_A$ increases. That is, the frequency of analysis increases. The seated passenger function $f_B$ increases the analysis period as the number of seated passengers $\alpha_B$ increases. That is, the frequency of analysis decreases. The standing passenger risk $\beta_A$ and the seated passenger risk $\beta_B$ may be predetermined by experiment or other means, or may be varied with congestion situations, passenger ratios, and other factors.

In the period determination unit 122, the function expressed by the above formula (1) is used when there is a mixture of standing and seated passengers. In cases where there are standing passengers only, the period determination unit 122 determines the analysis period by setting the term related to seated passengers in the formula (1) to 1, as in the following formula (1-1).

$$F=f_A(\alpha_A,\beta_A) \times 1 \quad (1-1)$$

In cases where there are seated passengers only or in cases where there are no passengers, the period determination unit 122 determines the analysis period by setting the term related to standing passengers in the formula (1) to zero, as in the following formula (1-2), and determines the analysis period to be zero. When the analysis period is set to zero, it may be prescribed that either no analysis is performed or the analysis is performed at regular longtime intervals.

$$F=0 \times f_B(\alpha_B,\beta_B) \quad (1-2)$$

The period determination unit 122 control the vehicle to prompt an alert according to the determined analysis period. For example, the period determination unit 122 controls the vehicle to prompt an alert in response to the determined analysis period being less than a predetermined value. The period determination unit 122 control the vehicle to prompt an alert in response to an instruction from the monitoring center 112 that received the analysis period. This can prevent the vehicle passengers from falling over. The period determination unit 122 increases the analysis period in response to detection of seating of a passenger from the standing position. Seating of a passenger from the standing position may be detected by monitoring the recognition data in storage unit 120 that is updated each time. An increase in analysis period may be recalculated using the above formula (1), or may be increased by a predetermined amount.

The analysis unit 123 analyzes body displacements of the passengers in the vehicle according to the analysis period determined by the period determination unit 122. Detailed description of the analysis will be omitted because the analysis is not a main focus of the present embodiment.

Operations of the analysis processing device 110 will now be described. FIG. 3 is a flowchart illustrating a process flow of an analysis period determination process among analysis processes to be performed by the analysis processing device 110. The CPU 11 reads the analysis processing program from the ROM 12 or the storage 14, develops it in the RAM 13, and executes it. The CPU 11 functions as each part of the analysis processing device 110. In the following process, the recognition data received from the sensor group 111 is previously stored in the storage 120.

At step S100, the CPU 11 acquires recognition data from the storage unit 120. Instead of acquiring the recognition data at a time at this step, necessary detection results among the recognition data may be acquired before necessary processing as appropriate.

At step S102, the CPU 11 calculates the number of boarding and alighting passengers from detection results of the infrared sensor or the like among the recognition data. Alternatively, a result of counting the number of boarding and alighting passengers acquired from camera-captured images among the recognition data may be used as the number of boarding and alighting passengers.

At step S104, the CPU 11 determines, from the number of boarding and alighting passengers, whether the number of passengers is greater than zero. If the number of passengers is greater than zero, the process flow proceeds to step S106. If the number of passengers is less than or equal to zero, the process flow proceeds to step S112.

At step S106, the CPU 11 calculates the number of seated passengers using detection results of the pressure-sensitive sensor or the like among the recognition data.

At step S108, the CPU 11 determines whether the number of seated passengers is equal to the number of passengers. If the number of seated passengers is equal to the number of passengers, the process flow proceeds to step S112. If the number of seated passengers is not equal to the number of passengers, the process flow proceeds to step S110.

At step S110, the CPU 11 calculates the number of standing passengers from the number of seated passengers and the number of passengers. The number of standing passengers may simply be the number of passengers minus the number of seated passengers, or consistency of the number of standing passengers may be determined using detection results of the image sensor or the like among the recognition data.

At step S112, the CPU 11 sets the standing passenger function $f_A$ to zero.

At step S114, the CPU 11 determines whether all of the passengers are standing passengers. If all of the passengers are standing passengers, the process flow proceeds to step S116. If not all of the passengers are standing passengers, the process flow proceeds to step S118. Where, if the number of passengers is equal to the number of standing passengers, it may be determined that all of the passengers are standing passengers.

At step S116, the CPU 11 sets the seated passenger function $f_B$ to one.

At step S118, the CPU 11 determines the analysis period of the vehicle according to the above formula (1) using the standing passenger function $f_A$ and the seated passenger function $f_B$.

As described above, the analysis processing system 100 of the embodiment of the present disclosure allows the analysis period to be adjusted responsive to external factors and can suppress analysis cost.

Modifications

Modifications to the embodiment set forth above will now be described.

In the embodiment described above, populations, such as the number of standing passengers and the number of seated passengers, are used in the function, but the embodiment is not limited thereto. In an alternative embodiment, the number of standing passengers and the number of seated passengers may be replaced by a density of standing passengers and a density of seated passengers, respectively. Where, the density of standing passengers and the density of seated passengers may be calculated using vehicle data including information on a size of the vehicle and detection results of the image sensor or the like among the recognition data.

The standing passenger function in the function expressed by the formula (1) may include an individual stability depending on a risk of falling for each passenger in the standing position, where the standing passenger function may be $f_A(\alpha_A, \beta_A, \gamma_A)$. The individual stability of each passenger is a variable that increases or decreases depending on, for example, a body size, an estimated age, a position in the vehicle, and a position of a handrail or strap, of the passenger. When used in the function, the variable for each passenger may be acquired to determine the total individual stability for the entire vehicle. The standing passenger function increases the analysis period as the individual stability increases. When using the individual stability, for example, the individual stability may be calculated using the recognition data or other data before performing step S118. For the seated passenger function, the need to include the individual stability is lower than for the standing passenger function as the seated passengers are basically stable, but the individual stability may be included depending on a degree of congestion or the like. The individual stability may also be defined for the seated passenger function, such as $f_B(\alpha_B, \beta_B, \gamma_B)$. The greater or lesser relationship between individual stability values is $\gamma_A < \gamma_B$. The individual stability may be designed to increase or decrease within a range that meets the greater or lesser relationship.

Each of the standing passenger function and the seated passenger function in the function expressed by the formula (1) may include a mutual interference from passenger's surroundings, where the standing passenger function is $f_A(\alpha_A, \beta_A, \varepsilon_A)$ and the seated passenger function is $f_B(\alpha_B, \beta_B, \varepsilon_B)$. The mutual interference is a variable that varies with a degree of congestion in the passenger's surroundings. The mutual interference for each passenger also varies depending on whether individual surrounding passengers are standing or seated. When used in the function, the variable for each passenger may be acquired to determine the total mutual interference for the entire vehicle. Each function increases the analysis period as the mutual interference decreases. When using the mutual interference, for example, the mutual interference may be calculated using the recognition data or other data before performing step S118. The greater or lesser relationship between mutual interference values is $\varepsilon_A > \varepsilon_B$. The mutual interference may be designed to increase or decrease within a range that meets the greater or lesser relationship.

The function expressed by the formula (1) may include a common risk function C depending on driving scenes of the vehicle. The common risk function C may be designed, for example, to vary with the driving scenes of the vehicle. When including the common risk function, the function expressed by the formula (1) may be $C \times f_A \times f_B$. The driving scenes of the vehicle include driving situations, such as a speed of the vehicle and whether brakes are being actuated, and route situations, such as whether the vehicle is traveling on a straight or curved road. For example, when the vehicle is traveling on a curve, the risk function may be designed to decrease the analysis period as swaying of the body is liable to cause a body displacement that may change joint moments. When using the common risk function C, for example, the common risk function C may be calculated using the recognition data or other data before performing step S118.

The function expressed by the formula (1) may be a function that includes an appropriate combination of the individual stability, the mutual interference, and the common risk function C described above.

The present disclosure is not limited to the embodiments set forth above, and various modifications and applications are possible without departing from the scope of the present disclosure.

The present specification has described the embodiments in which the program has been installed in advance, but the program may be stored in a computer-readable storage medium.

What is claimed is:

1. An analysis processing device for performing analysis on body displacements of passengers in a vehicle, comprising:
   a calculation unit configured to, based on recognition data including seated and standing positions of the passengers and a number of boarding and alighting passengers in the vehicle, calculate a number of seated passengers and a number of standing passengers;
   a period determination unit configured to determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated number of standing passengers and the predefined standing passenger risk as the number of standing passengers increases, the seated passenger function being designed to increase the analysis period using the calculated number of seated passengers and the predefined seated passenger risk as the number of seated passengers increases.

2. The analysis processing device according to claim 1, wherein
   the standing passenger function includes an individual stability depending on a risk of falling for each passenger in the standing position, and
   the period determination unit is configured to increase the analysis period as the individual stability increases.

3. The analysis processing device according to claim 1, wherein
   each of the standing passenger function and the seated passenger function in the function includes a mutual interference from surroundings of each passenger, and
   the period determination unit is configured to increase the analysis period as the mutual interference decreases.

4. The analysis processing device according to claim 1, wherein the function includes a common risk function depending on driving scenes of the vehicle.

5. The analysis processing device according to claim 1, wherein
   the period determination unit is configured to increase the analysis period in response to detection of seating of a passenger from the standing position.

6. The analysis processing device according to claim 1, wherein
   the period determination unit is configured to control the vehicle to prompt an alert according to the determined analysis period.

7. An analysis processing device for performing analysis on body displacements of passengers in a vehicle, comprising:
   a calculation unit configured to, based on prestored vehicle data and recognition data including seated and standing positions of the passengers, calculate a density of seated passengers and a density of standing passengers;
   a period determination unit configured to determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated density of standing passengers and the predefined standing passenger risk as the density of standing passengers increases, the seated passenger function being designed to increase the analysis period using the calculated density of seated passengers and the predefined seated passenger risk as the density of seated passengers increases.

8. The analysis processing device according to claim 7, wherein
   the standing passenger function includes an individual stability depending on a risk of falling for each passenger in the standing position, and
   the period determination unit is configured to increase the analysis period as the individual stability increases.

9. The analysis processing device according to claim 7, wherein
   each of the standing passenger function and the seated passenger function in the function includes a mutual interference from surroundings of each passenger, and
   the period determination unit is configured to increase the analysis period as the mutual interference decreases.

10. The analysis processing device according to claim 7, wherein the function includes a common risk function depending on driving scenes of the vehicle.

11. The analysis processing device according to claim 7, wherein
    the period determination unit is configured to increase the analysis period in response to detection of seating of a passenger from the standing position.

12. The analysis processing device according to claim 7, wherein
    the period determination unit is configured to control the vehicle to prompt an alert according to the determined analysis period.

13. An analysis processing method for performing analysis on body displacements of passengers in a vehicle, the method causing a computer to:

based on recognition data including seated and standing positions of the passengers and a number of boarding and alighting passengers in the vehicle, calculate a number of seated passengers and a number of standing passengers;

determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated number of standing passengers and the predefined standing passenger risk as the number of standing passengers increases, the seated passenger function being designed to increase the analysis period using the calculated number of seated passengers and the predefined seated passenger risk as the number of seated passengers increases.

14. An analysis processing method for performing analysis on body displacements of passengers in a vehicle, the method causing a computer to:

based on prestored vehicle data and recognition data including seated and standing positions of the passengers, calculate a density of seated passengers and a density of standing passengers; and determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated density of standing passengers and the predefined standing passenger risk as the density of standing passengers increases, the seated passenger function being designed to increase the analysis period using the calculated density of seated passengers and the predefined seated passenger risk as the density of seated passengers increases.

15. A non-transitory computer readable storage medium having instructions stored thereon that, when executed by a computer, cause the computer to perform analysis on body displacements of passengers in a vehicle, the instructions comprising:

instructions to, based on recognition data including seated and standing positions of the passengers and a number of boarding and alighting passengers in the vehicle, calculate a number of seated passengers and a number of standing passengers;

instructions to determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated number of standing passengers and the predefined standing passenger risk as the number of standing passengers increases, the seated passenger function being designed to increase the analysis period using the calculated number of seated passengers and the predefined seated passenger risk as the number of seated passengers increases.

16. A non-transitory computer readable storage medium having instructions stored thereon that, when executed by a computer, cause the computer to perform analysis on body displacements of passengers in a vehicle, the instructions comprising:

instructions to, based on prestored vehicle data and recognition data including seated and standing positions of the passengers, calculate a density of seated passengers and a density of standing passengers; and instructions to determine an analysis period of the vehicle according to a function that changes the analysis period depending on the seated and standing positions of the passengers, the function including a standing passenger function associated with passengers in the standing position among the passengers in the vehicle and a predefined standing passenger risk, and a seated passenger function associated with passengers in the seated position among the passengers in the vehicle and a predefined seated passenger risk, the standing passenger function being designed to decrease the analysis period using the calculated density of standing passengers and the predefined standing passenger risk as the density of standing passengers increases, the seated passenger function being designed to increase the analysis period using the calculated density of seated passengers and the predefined seated passenger risk as the density of seated passengers increases.

* * * * *